US012782626B2

(12) United States Patent
Wheatley et al.

(10) Patent No.: US 12,782,626 B2
(45) Date of Patent: Nov. 3, 2026

(54) OPTICAL SYSTEMS INCLUDING ANGLE CONTROL FILMS

(71) Applicant: 3M INNOVATIVE PROPERTIES COMPANY, St. Paul, MN (US)

(72) Inventors: John A. Wheatley, Stillwater, MN (US); Mark A. Roehrig, Stillwater, MN (US); Zhaohui Yang, North Oaks, MN (US); Bharat R. Acharya, Woodbury, MN (US); David J.W. Aastuen, Shoreview, MN (US); Serena L. Mollenhauer, Roberts, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 341 days.

(21) Appl. No.: 18/570,780

(22) PCT Filed: Jun. 20, 2022

(86) PCT No.: PCT/IB2022/055721
§ 371 (c)(1),
(2) Date: Dec. 15, 2023

(87) PCT Pub. No.: WO2023/275668
PCT Pub. Date: Jan. 5, 2023

(65) Prior Publication Data

US 2024/0280739 A1 Aug. 22, 2024

Related U.S. Application Data

(60) Provisional application No. 63/202,883, filed on Jun. 29, 2021.

(51) Int. Cl.
*G02B 5/30* (2006.01)
*G02B 3/00* (2006.01)
*G02B 5/28* (2006.01)

(52) U.S. Cl.
CPC ......... *G02B 5/3041* (2013.01); *G02B 3/0062* (2013.01); *G02B 5/28* (2013.01)

(58) Field of Classification Search
None
See application file for complete search history.

(56) References Cited

U.S. PATENT DOCUMENTS 7,433,552 B2 10/2008 Kiesel et al.
8,437,582 B2 5/2013 Kiesel et al.
(Continued)

FOREIGN PATENT DOCUMENTS

CN 211375615 U 8/2020
EP 2085797 A2 8/2009
(Continued)

OTHER PUBLICATIONS

International Search report for PCT International Application No. PCT/IB2022/055721, mailed on Sep. 20, 2022, 4 pages.

*Primary Examiner* — Shan Liu
(74) *Attorney, Agent, or Firm* — Jonathan L. Tolstedt

(57) ABSTRACT

An optical system includes a lens layer having a first major surface including first and second microlenses and a first light absorbing layer. The light absorbing layer defines first and second through openings with a one-to-one correspondence between the first and second microlenses and respective first and second through openings. Each pair of first microlens and first through opening centered on a first optical axis makes a first angle with a normal to the first light absorbing layer. Each pair of second microlens and second through opening centered on a second optical axis makes a second angle, different than the first angle, with the normal to the first light absorbing layer. A light source emits light incident on the first major surface side. The emitted light includes first and second light beams carrying respective
(Continued)

first and second information and propagating substantially parallel to the first and second optical axes, respectively.

15 Claims, 6 Drawing Sheets

(56) References Cited

U.S. PATENT DOCUMENTS

| | | | |
|---|---|---|---|
| 8,629,981 | B2 | 1/2014 | Martini et al. |
| 2007/0258149 | A1 | 11/2007 | Gardner et al. |
| 2012/0236313 | A1 | 9/2012 | Nakamura et al. |
| 2019/0137669 | A1* | 5/2019 | Wheatley ............... G02B 5/208 |
| 2022/0122374 | A1* | 4/2022 | Zhan .................. G06V 40/1324 |

FOREIGN PATENT DOCUMENTS

| | | | | |
|---|---|---|---|---|
| WO | 2017213911 | A1 | 12/2017 | |
| WO | 2018013363 | A1 | 1/2018 | |
| WO | WO-2020035768 | A1 * | 2/2020 | ........... G02B 3/0062 |
| WO | 2022130082 | A1 | 6/2022 | |

* cited by examiner

OPTICAL SYSTEMS INCLUDING ANGLE CONTROL FILMS

CROSS REFERENCE TO RELATED APPLICATIONS

This application is a national stage filing under 35 U.S.C. 371 of PCT/IB2022/055721, filed Jun. 20, 2022, which claims the benefit of U.S. Provisional Application No. 63/202,883, filed Jun. 29, 2021, the disclosures of which are incorporated by reference in their entireties herein.

TECHNICAL FIELD

The present disclosure generally relates to optical systems, particularly to optical system including spatially variant angle control films.

BACKGROUND

Optical systems are employed in a wide variety of applications such as optical communication systems, optical sensors, imaging, scientific and industrial optical equipment, and display systems. Optical systems may include optical layers that manage the transmission of incident electromagnetic radiation, including light.

SUMMARY

Some aspects of the disclosure relate to an optical system including an optical construction that includes a lens layer having a structured first major surface having an array of at least first and second microlenses. A first light absorbing layer is disposed on, and spaced apart from, the structured first major surface and defines an array of at least first and second through openings therein with a one-to-one correspondence between the first microlenses and the first through openings and between the second microlenses and the second through openings. Each pair of corresponding first microlens and first through opening centered on a first optical axis makes a same first angle with a normal to the first light absorbing layer. Each pair of corresponding second microlens and second through opening centered on a second optical axis makes a same second angle, different than the first angle, with the normal to the first light absorbing layer. A source of light emits light incident on the structured first major surface side of the optical construction. The emitted light includes a first light beam carrying a first information and propagating substantially parallel to the first optical axis and a second light beam carrying a different second information and propagating substantially parallel to the second optical axis.

Another aspect of the disclosure relates to an optical system including a source of light configured to emit a first light beam having a first wavelength and propagating substantially along a first direction and a second light beam having a different second wavelength and propagating substantially along a different second direction. A lens layer includes a structured first major surface having an array of microlenses facing the source of light. A polymeric multilayer optical film is disposed on the lens layer opposite the source of light. The polymeric multilayer optical film includes a plurality of polymeric microlayers numbering at least 10 in total. Each of the polymeric microlayers has an average thickness of less than about 500 nm. For light incident on the polymeric multilayer optical film and for at least a first polarization state, the plurality of polymeric microlayers has, for the light incident on the optical film along the first direction, an optical transmittance T1 for the first wavelength and an optical transmittance T2 for the second wavelength, where T1>10T2. For light incident on the polymeric multilayer optical film and for at least a first polarization state, the plurality of polymeric microlayers has, for the light incident on the optical film along the second direction, an optical transmittance T1' for the first wavelength and an optical transmittance T2' for the second wavelength, where T2'>10T1'.

Another aspect of the disclosure relates to an optical construction including a multilayer optical film having a plurality of microlayers numbering at least 10 in total. Each of the microlayers has an average thickness of less than about 500 nm. For light incident on the multilayer optical film and for each of a first and an orthogonal second, the plurality of microlayers has, for the light incident on the optical film along a first direction, an optical transmittance T1 for a first wavelength and an optical transmittance T2 for a different second wavelength, where T1>10T2. For light incident on the multilayer optical film and for each of a first and an orthogonal second, the plurality of microlayers has, for the light incident on the optical film along a second direction, an optical transmittance T1' for the first wavelength and an optical transmittance T2' for the second wavelength, where T2">10T1'. A lens layer includes a structured first major surface including an array of at least first and second microlenses. A first light absorbing layer is disposed on, and spaced apart from, the structured first major surface opposite the multilayer optical film. The first light absorbing layer defines an array of at least first and second through openings therein with a one-to-one correspondence between the first microlenses and the first through openings and between the second microlenses and the second through openings. Each pair of corresponding first microlens and first through opening is centered on a first optical axis substantially parallel to the first direction. Each pair of corresponding second microlens and second through opening is centered on a second optical axis substantially parallel to the second direction.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where, FIG. 1 schematically shows an optical system having an optical construction in accordance with some embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

In the following detailed description, reference is made to the accompanying drawings that form a part hereof, and in which are shown by way of illustration several specific embodiments. It is to be understood that other embodiments are contemplated and may be made without departing from the scope or spirit of the present disclosure.

In the fields of medical care, biometrics, agriculture, environment, and so on, optical systems including spectroscopic sensors are used for diagnosing and inspecting objects. Some embodiments of the disclosure relate to an optical system for near field optical analysis of materials that enables spatially resolved angular and/or wavelength analysis. In optical diagnostic tests in the health industry it is a common practice to measure the optical properties of an article to determine a test result; in these instances, the article could be either a liquid or solid. It could be, for example, an immunoassay. In these embodiments, the test protocol may require measurements of the intensity of one, two or more wavelengths as a metric to determine (e.g.) a person's resistance to bacteria. In other embodiments, the diagnostic tests may also measure the angular properties of light emitted from a sample, such as with turbidity measurements. The film of the present invention could be used for optical diagnostic tests to determine wavelength and/or angular properties of light emitting from diagnostic analytes. It may be particularly useful in mobile testing or so-called "point of care" testing where the test is not done in an industrial laboratory but rather in the field with a handheld reader.

The optical system may include an optical film including a spatially variant angle control film that is optionally used in combination with an angularly variable interference filter. In one embodiment, the interrogation light proceeds, sequentially, from the source, through the analyte, through the optical film and then arrives at the sensor. In other embodiments, the interrogation light proceeds, sequentially, from the source, through the optical film, through the analyte, and then arrives at the sensor.

The angle control film may be a lenslet aperture array having directional properties that change over the surface of the film. Either or both of lens shape or aperture can vary. Combination with an interference filter creates a bandshift sweep and thus a multispectral input for an area sensor such as CMOS or organic sensor array or Thin Film Transistor array.

Figure 1:
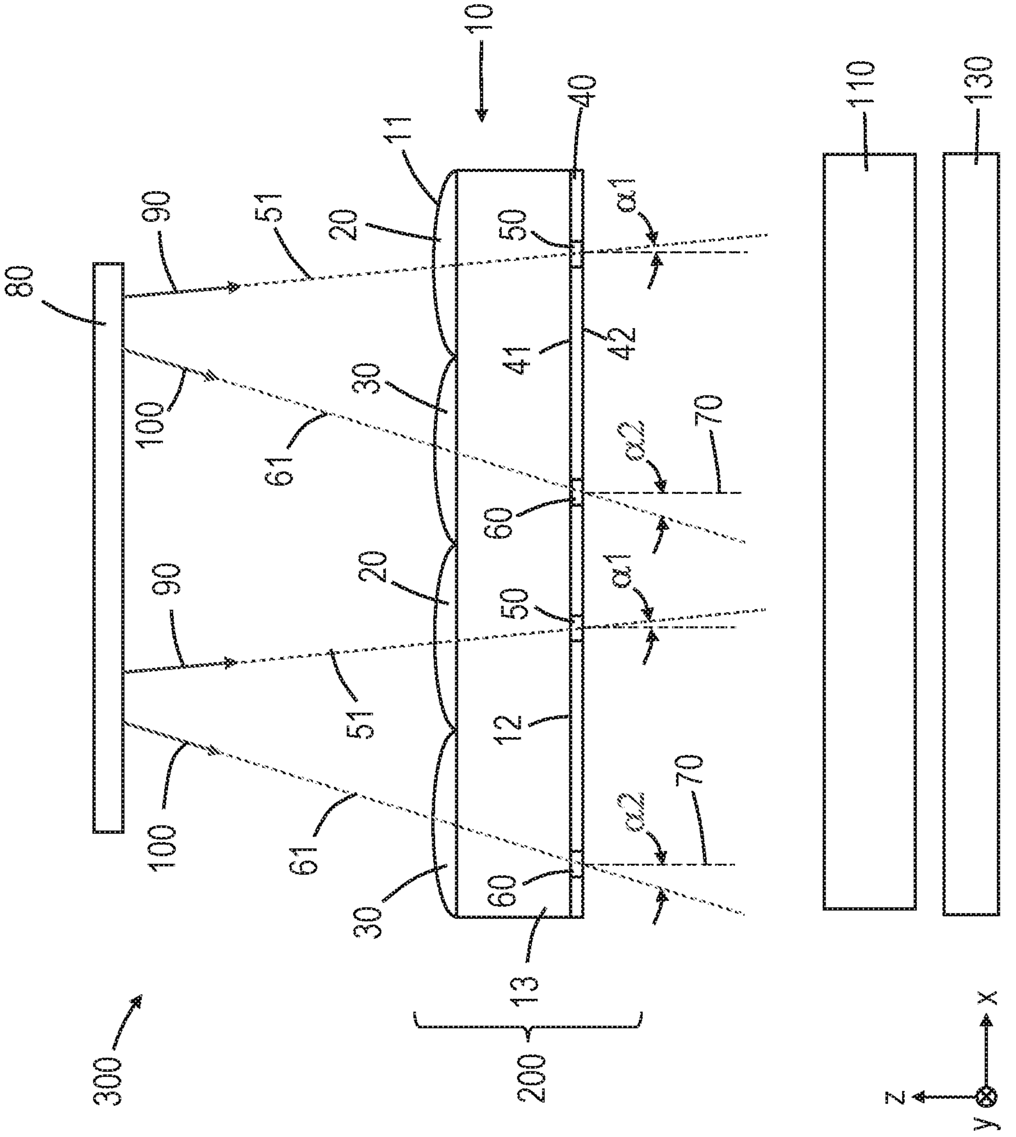

Some embodiments of the disclosure, as shown in FIG. 1, relate to an optical system (300) including an optical construction (200). The optical construction (200) in some aspects includes a lens layer (10) having a structured first major surface (11). In some aspects the lens layer (10) may further include a planar second major surface (12) disposed opposite the structured first major surface (11). The structured first major surface (11) may include at least first (20) and second (30) microlenses. The first and second microlenses (20, 30) may be arranged as an array of microlenses along orthogonal first (x-axis) and second (y-axis) directions.

A microlens is a lens having at least one lateral dimension (e.g., diameter) less than 1 mm. In some embodiments, the average diameter of the first and second microlenses (20, 30) may be in a range of 5 micrometers to 1000 micrometers. In some embodiments, the first and second microlenses (20, 30) may be curved about the orthogonal first (x-axis) and second (y-axis) directions. In other embodiments, the first and second microlenses (20, 30) may be lenticular microlenses. In some instances, the array of microlenses, can have one or more of different sizes, shapes, indices of refraction, and focal lengths. For instance, the array can be regular (e.g., square or hexagonal lattice) or irregular (e.g., random or pseudorandom). In some instances, the first (20) and second (30) microlenses may have substantially equal focal lengths. The microlenses used in any of the embodiments described herein can be any suitable type of microlenses. In some embodiments, an array of microlenses includes at least one of refractive lenses, diffractive lenses, metalenses (e.g., surface using nanostructures to focus light), Fresnel lenses, symmetric lenses (e.g., rotationally symmetric about an optical axis), asymmetric lenses (e.g., not rotationally symmetric about an optical axis), or combinations thereof. In some instances, at least some of the microlenses in the first (20) and second (30) microlenses may be spherical microlenses. In other instances, at least some of the microlenses in the first (20) and second (30) microlenses may be aspherical microlenses.

In some aspects, a substrate portion (13) may be disposed between the structured first major surface (11) and the planar second major surface (12). The substrate portion (13) may be made from PET, although polycarbonate and acrylic can also be used. In some aspects, it may be desirable to have a higher refractive index for the substrate layer (13), for instance greater than 1.50, so that the angular width of the cone of light within the substrate layer (13) is minimized.

The optical construction may include a first light absorbing layer (40) disposed on in a spaced apart relationship from the structured first major surface (11). In some cases, the substrate portion (13) may be disposed between the structured first major surface (11) and the first light absorbing layer (40). The first light absorbing layer (40) may define at least first (50) and second (60) through openings, or pinholes, therein. In some instances, the first light absorbing layer (40) may be an optically opaque mask layer disposed on the planar second major surface (12) of the lens layer (10). The first (50) and second (60) through openings in the first light absorbing layer (40) may be arranged in an array along the first (x-axis) and second (y-axis) directions.

In some embodiments, the first light absorbing layer (40) disposed on the planar second major surface (12) of the lens layer (10) may include a material having a transmission of less than 10%, or less than 5%, for normally incident unpolarized light in a predetermined wavelength range in the near-ultraviolet (e.g., less than 400 nm and at least 350 nm), visible (e.g., 400 nm to 700 nm) and/or infrared (greater than 700 nm and no more than 2500 nm). The transmission may depend on material properties (e.g., absorbance) and material thickness. In some embodiments, the first light absorbing layer (40) may be substantially optically opaque between adjacent openings in the array of first (50) and second (60) through openings. In some cases, the first light absorbing layer (40) may substantially block (e.g., blocks at least 70% of light by absorption, reflection, or a combination thereof) light incident on the layer between openings (50, 60) for at least one wavelength and for at least one polarization state.

In some embodiments, the first light absorbing layer (40) may be formed by applying a wavelength selective multilayer optical film onto the planar second major surface (12) and physical or optical openings (50, 60) can then be formed therein. In some embodiments, for at least one polarization state (and in some embodiments, for each of two orthogonal polarization states), the wavelength selective multilayer optical film may have regions between adjacent openings (50, 60) that transmit at least 60% of normally incident light in a predetermined first wavelength range (e.g., a near ultraviolet, a visible, or a near infrared range) and blocks at least 60% of normally incident light in a predetermined second wavelength range (e.g., a different near ultraviolet, a visible, or a near infrared range).

In some aspects, the first through openings (50) may be aligned to the first microlenses (20) in a one-to-one correspondence and the second through openings (60) may be aligned to the second microlenses (30) in a one-to-one correspondence. In some cases, at least one of the first and second microlenses (20, 30) may be lenticular microlenses and at least some of the first and second through openings (50, 60) may be slits (optically or physically) having a width substantially smaller than a width of the lenticular microlenses and having a length extending in a direction along the length of the lenticular microlenses. The first and second through openings (50, 60) formed in any of the embodiments described herein can have any suitable shape. In some embodiments, the array of first and second through openings (50, 60) may include at least one of elliptical pinholes, circular pinholes, rectangular pinholes, square pinholes, triangular pinholes, and irregular pinholes. In some cases, the array of first and second through openings (50, 60) may include any combinations of these pinhole shapes.

The first and second through openings (50, 60) in the first light absorbing layer (40) may be formed by laser ablation through the first and second microlenses (20, 30), for example. Suitable lasers may include fiber lasers such as a 40 W pulsed fiber laser operating a wavelength of 1070 nm, for example. Creating openings in a layer using a laser through a microlens array is generally described in US2007/0258149 (Gardner et al.), for example. An absorption overcoat can optionally be applied to the optical construction (200) to increase the absorption of energy from the laser. In some embodiments, the first light absorbing layer (40) disposed on the planar second major surface (12) of the lens layer (10) may include a UV-cured polymer material and the plurality of laser ablated first and second through openings (50, 60) may be formed therein. In some embodiments, we define UV spectral range to include 300-400 nm. It may be desirable that the UV-cured polymer material has sufficiently high absorption of the laser to be ablated to form the opening. After ablation, it may be desirable that the first light absorbing layer (40) including the UV-cured polymer material blocks visible light to a sufficiently high degree to meet the light blocking metrics (FWHM, cross talk etc.). For example, the first light absorbing layer (40) may include carbon black coated polymer material, which absorbs visible light and infrared light of the laser. For instance, various carbon black loadings may be used to strike a balance between ablation/absorption properties and processability. A roll coating process may be used to coat the carbon black-loaded material on the lens layer. UV lights (Fusion D lamps) may be employed to cure the coating.

In some aspects, at least one of the through openings in the first (50) and second (60) through openings may be a physical through opening extending from a first major surface (41) of the first light absorbing layer (40) to an opposite second major surface (42) of the first light absorbing layer (40). In some other aspects, at least one of the through openings in the first (50) and second (60) through openings may be an optical through opening extending from a first major surface (41) of the first light absorbing layer (40) to an opposite second major surface (42) of the first light absorbing layer (40).

In some embodiments, each pair of corresponding first microlens (20) and first through opening (50) centered on a first optical axis (51) may make a same first angle ($\alpha 1$) with a normal (70) to the first light absorbing layer (40). Each pair of corresponding second microlens (30) and second through opening (60) centered on a second optical axis (61) may make a same second angle ($\alpha 2$) with the normal (70) to the first light absorbing layer (40). In some embodiments, the second angle ($\alpha 2$) may be different than the first angle ($\alpha 1$). For instance, the first angle ($\alpha 1$) may be less than about 20 degrees, or less than about 15 degrees, or less than about 10 degrees, or less than about 5 degrees. In some instances, the second angle ($\alpha 2$) may be greater than about 30 degrees or greater than about 35 degrees, or greater than about 40 degrees, or greater than about 45 degrees, or greater than about 50 degrees, or greater than about 55 degrees. In some embodiments, a difference between the first ($\alpha 1$) and second ($\alpha 2$) angles may be greater than about 5 degrees, or, in other embodiments, greater than about 10 degrees, or greater than about 15 degrees, or greater than about 20 degrees, or greater than about 25 degrees, or greater than about 30 degrees, or greater than about 35 degrees, or greater than about 40 degrees, or greater than about 45 degrees, or greater than about 50 degrees, or greater than about 55 degrees, or greater than about 60 degrees, or greater than about 65 degrees, or greater than about 70 degrees.

In some embodiments, the optical system (300) may include a source of light (80) configured to emit light (90, 100) incident on the structured first major surface side (11) of the optical construction (200). In some aspects, the emitted light may include a first light beam (90) and a second light beam (100). The first light beam (90) may carry a first information and may propagate substantially parallel to the first optical axis (51). The second light beam (100) may carry a different second information and may propagate substantially parallel to the second optical axis (61). The optical system (200) may be configured such that the lens layer (10) including the structured first major surface (11) having an array of microlenses (20, 30) faces the source of light (80).

Figure 3:
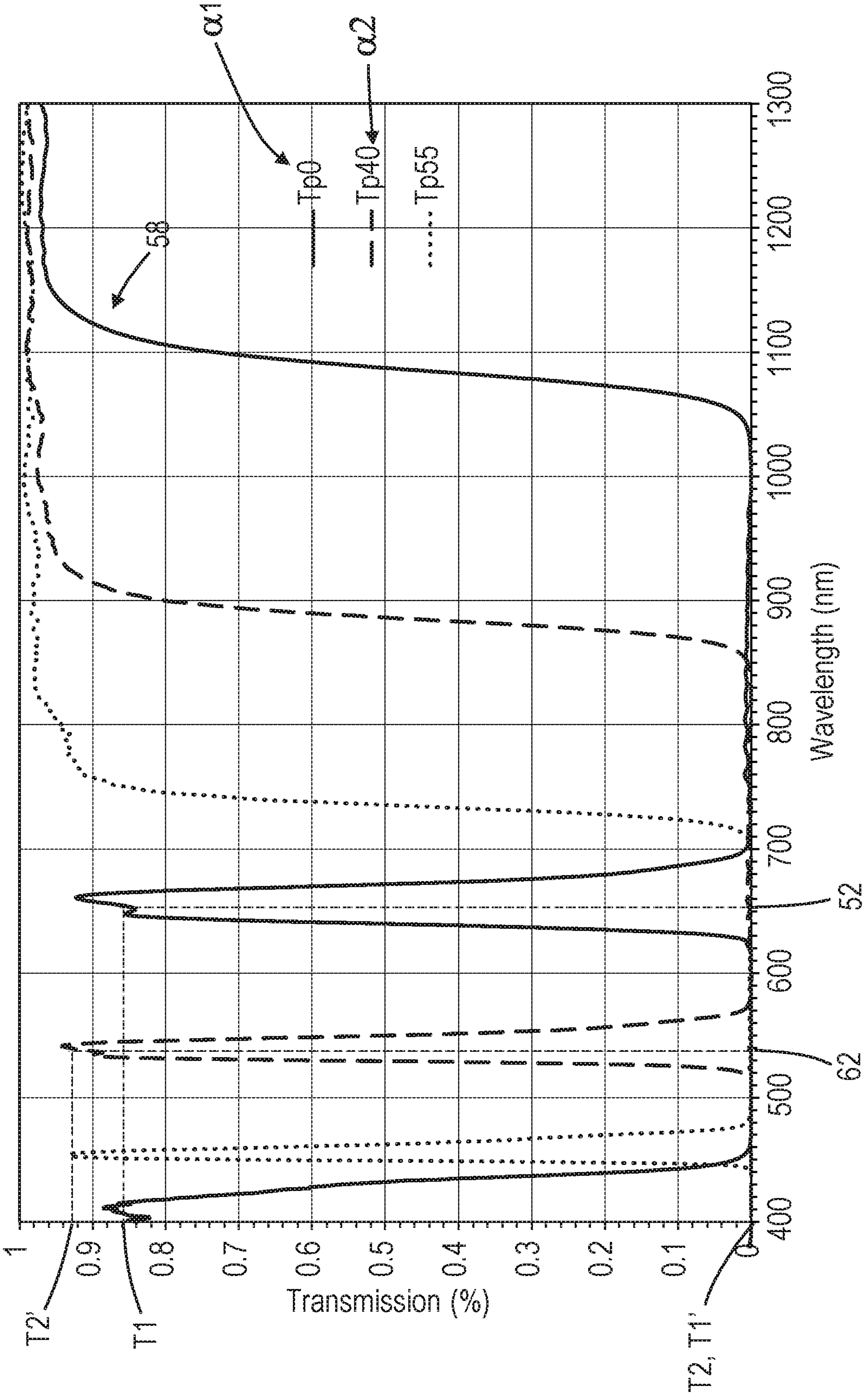
FIGS. 3 and 4 graphically represent optical transmittance of the multilayer optical film as a function of wavelength according to some aspects of the disclosure.
Figure 4:
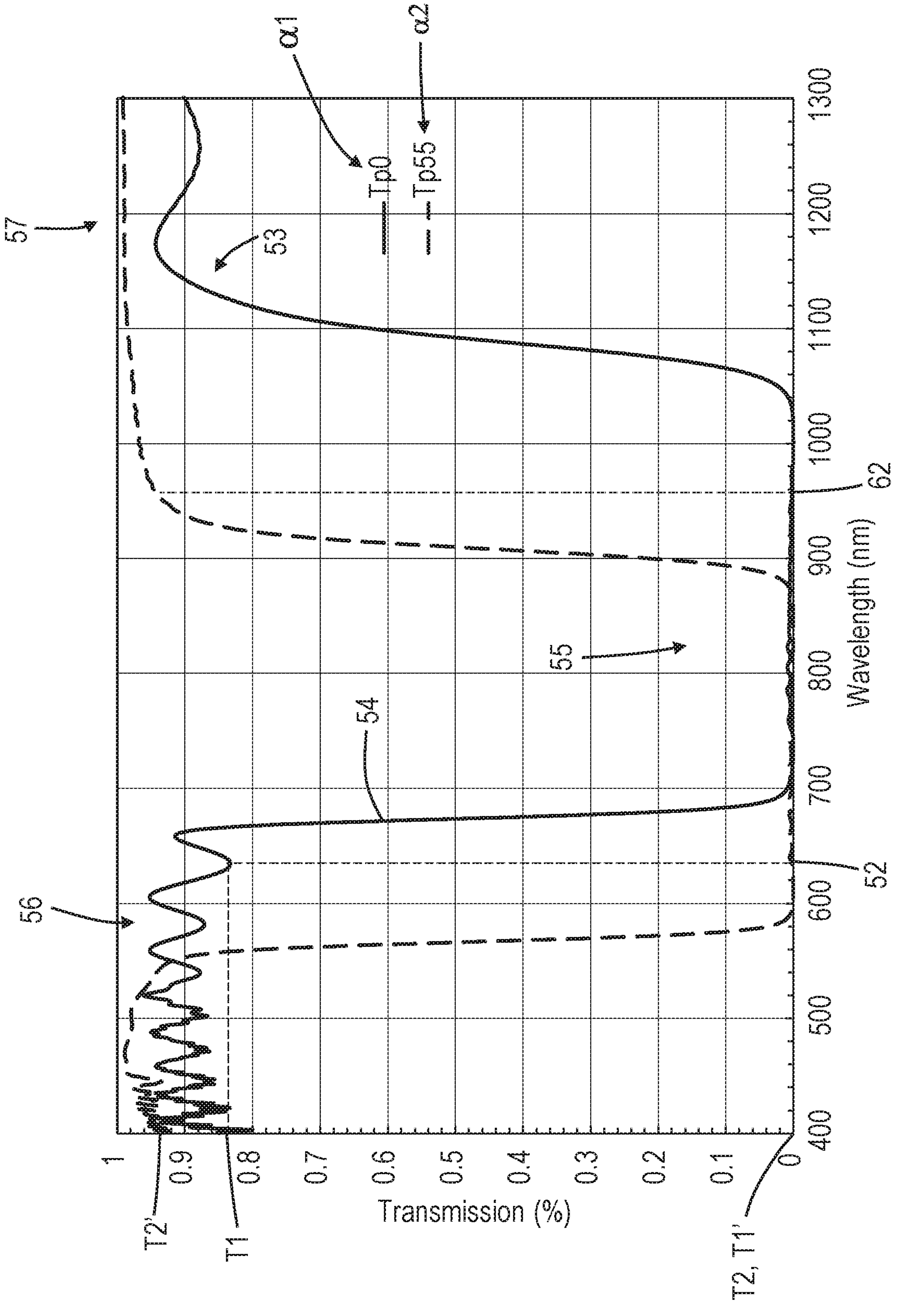

As shown in FIGS. 3 and 4, the first light beam (90), propagating substantially along a first direction (51), may have a first wavelength (52) and the second light beam (100), propagating substantially along a different second direction (61), may have a different second wavelength (62). In some cases, as best shown in FIG. 3, each of the first (52) and second (62) wavelengths may be a visible wavelength between about 420 nm and about 680 nm. In other cases, as best shown in FIG. 4, one (52) of the first and second wavelengths may be a visible wavelength between about 420 nm and about 680 nm, and the other one (62) of the first and second wavelengths may be an infrared wavelength between about 750 nm and about 1300 nm. In some aspects, the first and second directions (51, 61) may form an angle of greater than about 5 degrees, or, in some instances, greater than about 10 degrees, or 15 degrees, or 20 degrees, or 25 degrees, or 30 degrees, or 35 degrees, or 40 degrees, or 45 degrees, or 50 degrees, or 55 degrees, or 60 degrees, or 65 degrees, or 70 degrees therebetween.

The optical system (300) may further include an optical sensor (130) configured to receive and sense at least the first (90) and second (100) light beams emitted by the source of light (80) and transmitted through the first (50) and second (60) through openings.

Figure 5:
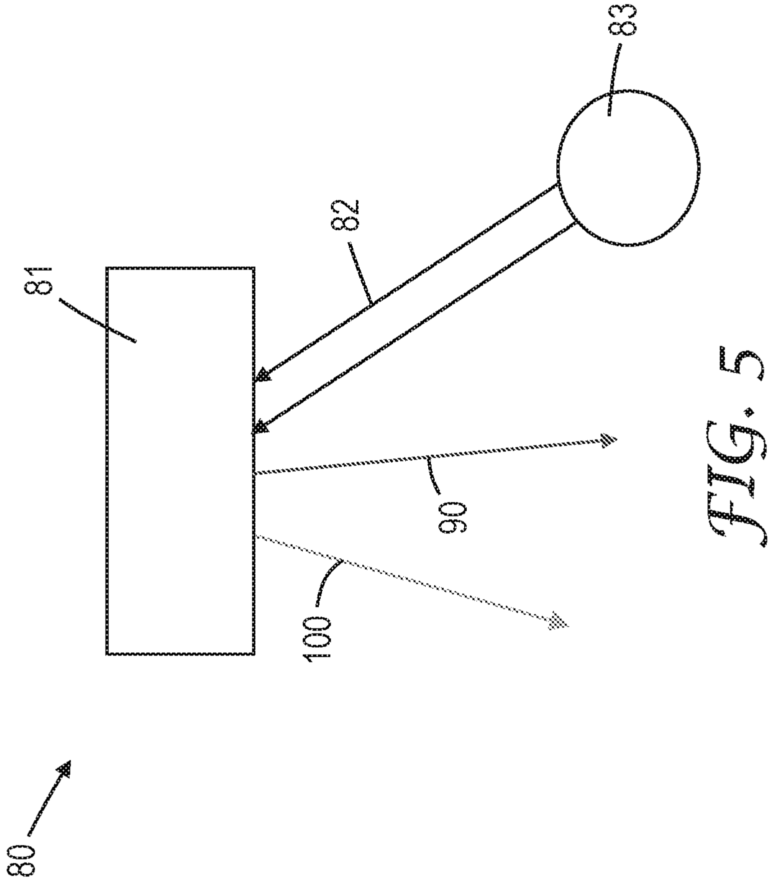
FIG. 5 schematically shows the construction of a light source of the optical system according to some embodiments.

Referring to FIG. 5, in some embodiments, the source of light (80) may include a body part (81) of a human or an animal, and the light emitted by the body part may include light (82) received and reflected by the body part from an illumination source (83). In some embodiments, the first and second information may include one or more of a wavelength, an angle, an oxygen level of a human or an animal body portion, an image of a human or an animal body portion, an image of finger print, an image of a human or an animal vein, a light absorption by a human or an animal body portion, a temporal information, a spatial information, a hydration state of a living being, and a blood content of a living being.

In some embodiments, the optical system (300) may be a bioanalytic device (e g., optically determines hemoglobin concentration), and/or a molecular analysis device (e.g., optically determines blood glucose levels). In some embodiments, the optical sensor (130) may be configured to detect a fingerprint and the optical system (300) including the optical construction (200) may be configured to determine if a detected fingerprint matches a fingerprint of an authorized user.

Figure 2:
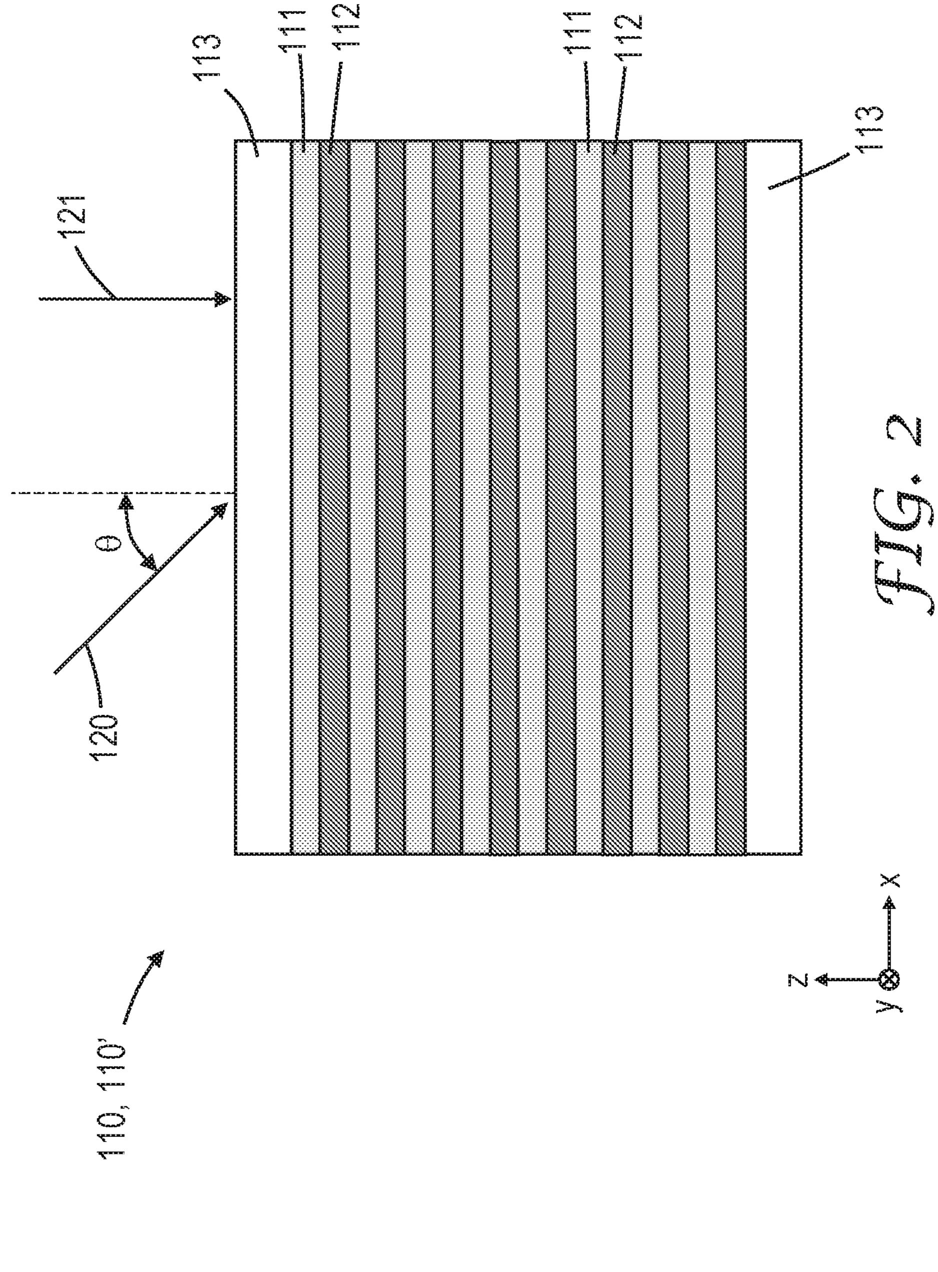
FIG. 2 schematically shows a construction of a multilayer optical film of the optical system in accordance with some embodiments.

The optical system (300), in some embodiments, may include a multilayer optical film (110) disposed on the first light absorbing layer (40) opposite the source of light (80). The multilayer optical film (110) may be a polymeric multilayer optical film including a plurality of polymeric microlayers (111, 112), as shown in FIG. 2. In some embodiments, the plurality of polymeric microlayers (111, 112) may include a plurality of alternating polymeric different first (111) and second (112) microlayers. For instance, the multilayer optical film (110) may include alternating first (111) and second (112) polymeric microlayers including at least one birefringent polymer (e.g. oriented semi-crystalline polymer) and one second polymer.

In other embodiments, the materials of first and second microlayers (111, 112) may be composed of polymers such as polyesters. For instance, an exemplary polymer useful as a first birefringent layer (111) may be polyethylene naphthalate (PEN). Other semicrystalline polyesters suitable as birefringent polymers as the first birefringent layer (111) in the multilayer polymeric film may include, for example, polybutylene 2,6-naphthalate (PBN), polyethylene terephthalate (PET), or the like. The second layer (112) can be made from a variety of polymers having glass transition temperatures compatible with that of the first birefringent polymer layer (111) and having a refractive index similar to the isotropic refractive index of the first birefringent polymer layer (111). Examples of other polymers suitable for use in optical films and, particularly, in the second polymer layer (112) may include vinyl polymers and copolymers made from monomers such as vinyl naphthalenes, styrene, maleic anhydride, acrylates, and methacrylates. Examples of such polymers for the second polymer layer (112) include polyacrylates, polymethacrylates, such as poly methyl methacrylate (PMMA), and isotactic or syndiotactic polystyrene. Other polymers include condensation polymers such as polysulfones, polyamides, polyurethanes, polyamic acids, and polyimides. In addition, the second polymer layer (112) can be formed from homopolymers and copolymers of polyesters, polycarbonates, fluoropolymers, and polydimethylsiloxanes, and blends thereof. The layers can be selected to achieve the reflection of a specific bandwidth of electromagnetic radiation.

In one embodiment, the materials of the plurality of layers (111, 112) may have differing indices of refraction. In some embodiments, the multilayer optical film (110) may include PET as the first optical layer (111) and co polymers of PMMA (coPMMA), or any other polymer having low refractive index, including copolyesters, fluorinated polymers or combinations thereof as the second optical layer (112). The transmission and reflection characteristics of the multilayer optical film (110) may be based on coherent interference of light caused by the refractive index difference between the layers (111, 112) and the thicknesses of layers (111, 112).

In some instances, the plurality of polymeric microlayers (111, 112) may number at least 10, or 20 in total. In some cases, the plurality of polymeric microlayers (111, 112) may number at least 50, or at least 100, or at least 200, or at least 300, or at least 400, or at least 500 in total. Each of the polymeric microlayers (11, 12) may have an average thickness of less than about 500 nm, or less than about 400 nm, or less than about 300 nm, or less than about 200 nm, or less than about 150 nm. In some embodiments, the number of layers in the multilayer optical film (110) may be selected to achieve the desired optical properties using the minimum number of layers for reasons of film thickness, flexibility and economy.

In some aspects, for a substantially normally incident light (121) and for at least one wavelength in a visible wavelength range from about 420 nm to about 680 nm, the plurality of polymeric microlayers (111, 112) may transmit at least 60% of the incident light having the first polarization state (x-axis), and may reflect at least 60% of the incident light having an orthogonal second polarization state (y-axis).

In other aspects, for a substantially normally incident light (121) and for at least one wavelength in a visible wavelength range from about 420 nm to about 680 nm, the plurality of polymeric microlayers (111, 112) may transmit at least 60% of the incident light for each of the first polarization state (x-axis) and an orthogonal second polarization state (y-axis).

In other aspects, the optical film (110) may further include at least one skin layer (113) disposed on the plurality of polymeric microlayers (111, 112). The skin layer (13) may have an average thickness of greater than about 500 nm. In some cases, the skin layer (13) may have an average thickness of greater than about 750 nm, or greater than about 1000 nm, or greater than about 1250 nm, or greater than about 1500 nm, or greater than about 2000 nm.

According to some embodiments, an incident light (120) may be incident on the optical film (110) at an incident angle (θ). In some aspects, for light (120) incident on the polymeric multilayer optical film (110) and for at least a first polarization state (x-axis), the plurality of polymeric microlayers (111, 112) has, for an incident angle (θ) substantially equal to the first angle (α1), an optical transmittance T1 for the first wavelength (52) and an optical transmittance T2 for the second wavelength (62), wherein T1>T2, as shown in FIGS. 3 and 4. In some aspects, T1>10T2, or T1>50T2, or T1>100T2, or T1>500T2, or T1>1000T2.

According to another aspect, for light (120) incident on the polymeric multilayer optical film (110) and for at least a first polarization state (x-axis), the plurality of polymeric microlayers (111, 112) has, for an incident angle (θ) substantially equal to the second angle (α2), an optical transmittance T1' for the first wavelength (52) and an optical transmittance T2' for the second wavelength (62), wherein T2'>T1'. In some aspects, T2'>10T1', or T2'>50T1', or T2>100T1', or T2'>500T1', or T2'>1000T1'.

In some embodiments, as best seen in FIG. 3, for the incident angle (θ) substantially equal to the first angle (α1), an optical transmittance (58) of the plurality of microlayers (111, 112) versus wavelength may include a transmission pass band including the first (52), but not the second (62), wavelength. Changing the incident angle (θ) from the first angle (α1) to the second angle (α2) may shift the transmission pass band so that the shifted transmission pass band may include the second wavelength (62), but not the first wavelength (52).

In other embodiments, as best seen in FIG. 4, for the incident angle (θ) substantially equal to the first angle (α1), an optical transmittance (53) of the plurality of microlayers (111, 112) versus wavelength may include a transmission stop band (55) including the second wavelength (62), but not the first wavelength (52). Changing the incident angle (θ) from the first angle (α1) to the second angle (α2) shifts the transmission stop band so that the shifted transmission stop band may include the first wavelength (52), but not the second wavelength (62).

In other aspects, for light (120) incident on the polymeric multilayer optical film (110) and for at least a first polarization state (x-axis), the plurality of polymeric microlayers (111, 112) has, for the light incident on the optical film (110) along the first direction (51), an optical transmittance T1 for the first wavelength (52) and an optical transmittance T2 for the second wavelength (62), wherein T1>T2, as shown in FIGS. 3 and 4. In some aspects, T1>10T2, or T1>50T2, or T1>100T2, or T1>500T2, or T1>1000T2.

According to another aspect, for light (120) incident on the polymeric multilayer optical film (110) and for at least a first polarization state (x-axis), the plurality of polymeric microlayers (111, 112) has, for the light incident on the optical film (110) along the second direction (61), an optical transmittance T1' for the first wavelength (52) and an optical transmittance T2' for the second wavelength (62), wherein T2'>T1'. In some aspects, T2'>10T1', or T2'>50T1', or T2'>100T1', or T2'>500T1', or T2'>1000T1'.

In some aspects, T1-T2 may be greater than about 20%, or greater than about 30%, or greater than about 40%, or greater than about 50%, or greater than about 60%, or greater than about 70%, or greater than about 80%, or greater than about 90%.

In some aspects, T2-T1' may be greater than about 20% or greater than about 30%, or greater than about 40%, or greater than about 50%, or greater than about 60%, or greater than about 70%, or greater than about 80%, or greater than about 90%.

In some aspects, a magnitude of a difference between T1 and T2' may be less than about 30%, or less than about 25%, or less than about 20%, or less than about 15%, or less than about 10%. In some other aspects, a magnitude of a difference between T2 and T1' may be less than about 20%, or less than about 15%, or less than about 10%, or less than about 5%, or less than about 2%.

Figure 6:
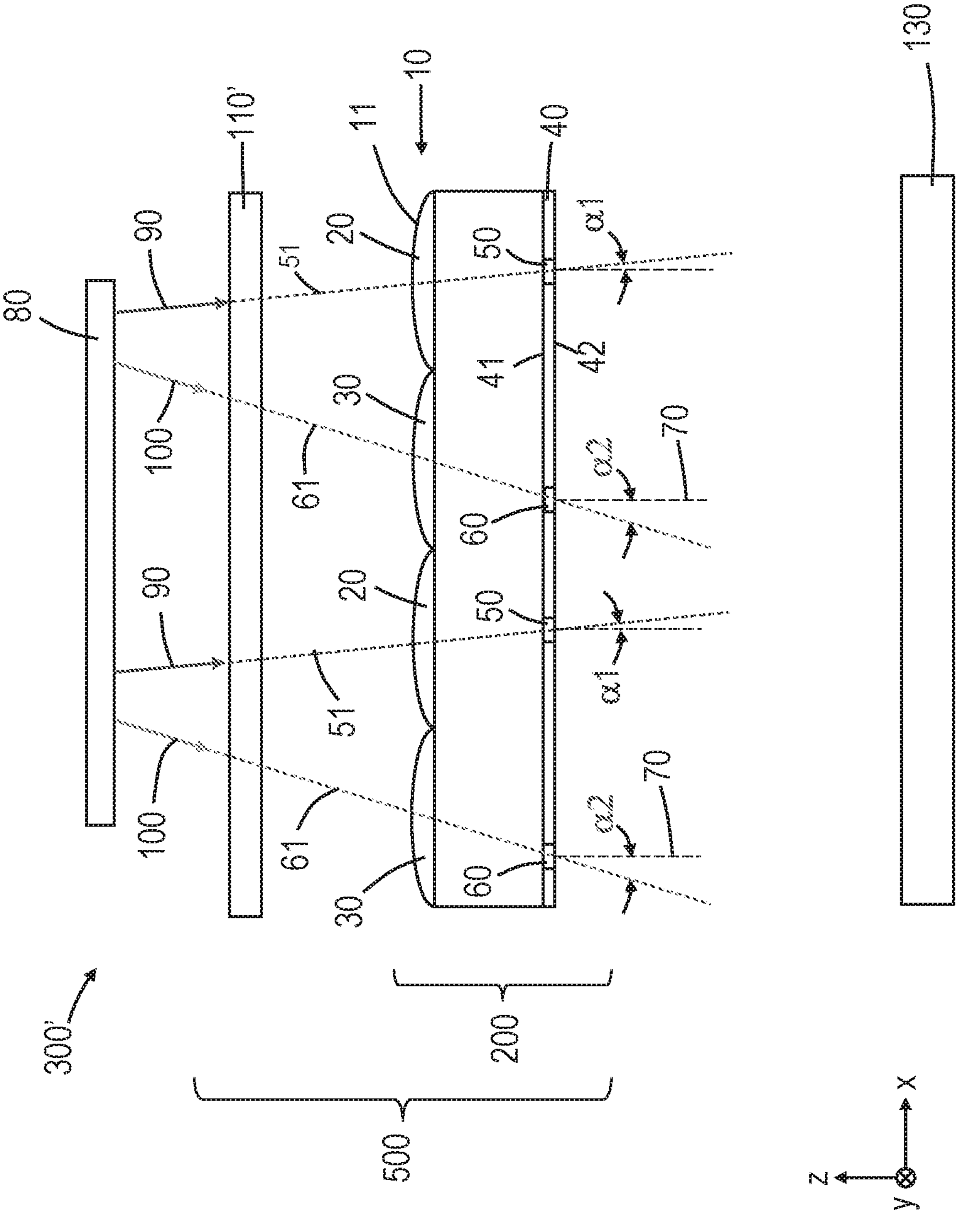
FIG. 6 schematically shows an optical system having an optical construction in accordance with other embodiments.

According to the embodiment as illustrated in FIG. 6, the optical system (300') includes an optical construction (500). The optical construction may include a multilayer optical film (110') including a plurality of microlayers (111, 112) as shown in FIG. 2 and described previously. The optical construction (500) includes a lens layer (10) having a structured first major surface (11) including an array of at least first (20) and second microlenses (30). A first light absorbing layer (40), as described previously, may be disposed on, and spaced apart from, the structured first major surface (11) opposite the multilayer optical film (110').

The first light absorbing layer (40) may define at least first (50) and second (60) through openings, or pinholes, therein. The first (50) and second (60) through openings in the first light absorbing layer (40) may be arranged in an array along the first (x-axis) and second (y-axis) directions. The first through openings (50) may be aligned to the first microlenses (20) in a one-to-one correspondence and the second through openings (60) may be aligned to the second microlenses (30) in a one-to-one correspondence. Each pair of corresponding first microlens (20) and first through opening (50) may be centered on a first optical axis (51) substantially parallel to the first direction. Each pair of corresponding second microlens (30) and second through opening (60) may be centered on a second optical axis (61) substantially parallel to the second direction.

For light (120) incident on the multilayer optical film (110') along a first direction, and for each of a first (x-axis) and an orthogonal second (y-axis), the plurality of microlayers (111, 112) has an optical transmittance T1 for a first wavelength (52) and an optical transmittance T2 for a different second wavelength (62), wherein T1>T2. In some aspects, T1>10T2, or T1>50T2, or T1>100T2, or T1>500T2, or T1>1000T2.

In other aspects, for light (120) incident on the multilayer optical film (110') along a second direction, and for each of a first (x-axis) and an orthogonal second (y-axis), the plurality of microlayers (111, 112) has an optical transmittance T1' for the first wavelength (52) and an optical transmittance T2' for the second wavelength (62), wherein T2'>T1'. In some aspects, T2'>10T1', or T2'>50T1', or T2'>100T1', or T2>500T1', or T2>1000T1'.

In some aspects, the first and second directions (51, 61) may form an angle of greater than about 5 degrees, or, in some instances, greater than about 10 degrees, or 15 degrees, or 20 degrees, or 25 degrees, or 30 degrees, or 35 degrees, or 40 degrees, or 45 degrees, or 50 degrees, or 55 degrees, or 60 degrees, or 65 degrees, or 70 degrees therebetween.

In some cases, as best shown in FIG. 3, one (52) of the first and second wavelengths may be a visible wavelength between about 420 nm and about 680 nm. The other one (62) of the first and second wavelengths may be an infrared wavelength between about 750 nm and about 1300 nm.

There are several uses of the optical system described in one or more embodiments of this disclosure. One use is in biometrics applications, for instance, in wearables where optimization of source angular output distribution and detector angular collection properties can be co-optimized. This can minimize cross-talk and ensure that the detector is sampling light that has sufficiently interacted with tissue. Often it is useful to collect light from a range of different depths and angles in optical wearables.

Another use of the optical system described in this disclosure is to determine the angular scattering properties of light emerging from tissue. The optical system according to one or more embodiments of the disclosure, when used with a sensor array, becomes a conoscopic analysis film that can determine the angular properties of light emerging from a medium, such as skin. Angular properties of light emerging from skin can be used potentially for identification purposes but also for detecting perfusion where subsurface leakage from a hospital IV can be detected. Optical differences over time of diffusely scattered light can provide early warning of a potentially serious condition. Also, angular information on skin scattering properties can be used with image correction algorithms to improve the image quality of vein patterns.

Another application of the optical system according one or more embodiments disclosed herein relates to vein imaging. The optimum wavelengths for vein imaging is around 850 nm. For sensor applications behind the LCD panel, where the near infrared (NIR) transparency of multilayer optical film (MOF) is important, this becomes problematic since the angular shift of MOF at this low of wavelength will create undesirable color in ESR or reflective polarizers. However with the optical construction of the present disclosure, a much higher band edge film could be used and the sensor look at an oblique angle through the film. At the oblique angle, the band shifts sufficiently to enable near IR transmission at lower than 850 nm. Hence a higher, non-color causing wavelength such as 900 nm could be used but yet the sensor could still look through the film at the 850 nm optimum wavelength for vein imaging.

Another application of the optical system of the present disclosure is in hyperspectral imaging in which a spectrometer film is made by combining the optical construction of the present disclosure with an interference filter. Light is incident on the MOF at 4 different incidence angles, resulting in 4 different transmission spectra. Here an MOF edge filter may be used, however, with a simple algorithm, it is in effect a series of notch filters. Alternately, a notch filter as the MOF may also be used. Both organic and inorganic filters will work, but MOF filters are preferred since they have no Brewster's angle and will not leak light at angle. Such hyperspectral films find applications in liveness detection, health monitoring, fluorescence detection, skin health, test strips (from subjective color to quantitative spectroscopy, IV perfusion, etc.

The optical system of one or more embodiments could further incorporate uniform or spatially variant retarders or absorbing polarizers. This enables a polarimetry and spectrometry. Also, an absorbing polarizer can be used as a cleanup polarizer for any s and p polarization separation off angle. A wide variety of sensors could be used with the film including CCD, CMOS, TFT arrays and organic sensor arrays. A wide variety of light sources could be used to provide illumination including incandescent, LED, OLED, laser diodes, VCSELs, fluorescent or natural light from the sun. The overall area sensing assembly could be small (mm or sub mm) to large, 10s or 100s of square cm. A variety of spatial repeat patterns are possible.

Although specific embodiments have been illustrated and described herein, it will be appreciated by those of ordinary skill in the art that a variety of alternate and/or equivalent implementations can be substituted for the specific embodiments shown and described without departing from the scope of the present disclosure.

The invention claimed is:

1. An optical system comprising:

an optical construction comprising:

a lens layer comprising a structured first major surface comprising an array of at least first and second microlenses;

a first light absorbing layer disposed on, and spaced apart from, the structured first major surface and defining an array of at least first and second through openings therein, there being a one-to-one correspondence between the first microlenses and the first through openings and between the second microlenses and the second through openings, each pair of corresponding first microlens and first through opening centered on a first optical axis making a same first angle with a normal to the first light absorbing layer, each pair of corresponding second microlens and second through opening centered on a second optical axis making a same second angle, different than the first angle, with the normal to the first light absorbing layer; and a source of light emitting light incident on the structured first major surface side of the optical construction, the emitted light comprising a first light beam carrying a first information and propagating substantially parallel to the first optical axis and a second light beam carrying a different second information and propagating substantially parallel to the second optical axis.

2. The optical system of claim 1, wherein the first light beam has a first wavelength and the second light beam has a different second wavelength.

3. The optical system of claim 2 further comprising a polymeric multilayer optical film disposed on the first light absorbing layer and on a side of the first light absorbing layer facing away from the source of light, the polymeric multilayer optical film comprising a plurality of polymeric microlayers numbering at least 10 in total, each of the polymeric microlayers having an average thickness of less than about 500 nm, such that for light incident on the polymeric multilayer optical film and for at least a first polarization state, the plurality of polymeric microlayers has:

for an incident angle substantially equal to the first angle, an optical transmittance T1 for the first wavelength and an optical transmittance T2 for the second wavelength, T1>T2; and for an incident angle substantially equal to the second angle, an optical transmittance T1' for the first wavelength and an optical transmittance T2' for the second wavelength, T2'>T1'.

4. The optical stack of claim 1, wherein for the incident angle substantially equal to the first angle, an optical transmittance of the plurality of microlayers versus wavelength comprises a transmission pass band comprising the first, but not the second, wavelength, such that changing the incident angle from the first angle to the second angle shifts the transmission pass band so that the shifted transmission pass band comprises the second, but not the first, wavelength.

5. The optical system of claim 1 further comprising an optical sensor configured to receive and sense at least the first and second light beams emitted by the source of light and transmitted through the first and second through openings.

6. The optical system of claim 1, wherein the first and second information comprise one or more of a wavelength, an angle, an oxygen level of a human or an animal body portion, an image of a human or an animal body portion, an image of finger print, an image of a human or an animal vein, a light absorption by a human or an animal body portion, a temporal information, a spatial information, a hydration state of a living being, and a blood content of a living being.

7. An optical system comprising:

a source of light configured to emit a first light beam having a first wavelength and propagating substantially along a first direction and a second light beam having a different second wavelength and propagating substantially along a different second direction;

a lens layer comprising a structured first major surface comprising an array of microlenses facing the source of light; and a polymeric multilayer optical film disposed on the lens layer and on a side of the lens layer facing away from the source of light, the polymeric multilayer optical film comprising a plurality of polymeric microlayers numbering at least 10 in total, each of the polymeric microlayers having an average thickness of less than about 500 nm, such that for light incident on the polymeric multilayer optical film and for at least a first polarization state, the plurality of polymeric microlayers has:

for the light incident on the optical film along the first direction, an optical transmittance T1 for the first wavelength and an optical transmittance T2 for the second wavelength, T1>10T2; and for the light incident on the optical film along the second direction, an optical transmittance T1' for the first wavelength and an optical transmittance T2' for the second wavelength, T2'>10T1'.

8. The optical system of claim 7, wherein the first and second directions form an angle of greater than about 5 degrees therebetween.

9. The optical system of claim 7, wherein each of the first and second wavelengths is a visible wavelength between about 420 nm and about 680 nm.

10. The optical system of claim 7, wherein one of the first and second wavelengths is a visible wavelength between about 420 nm and about 680 nm, and the other one of the first and second wavelengths is an infrared wavelength between about 750 nm and about 1300 nm.

11. The optical system of claim 7, wherein T1-T2 is greater than about 20% and T2'-T1' is greater than about 20%.

12. An optical construction comprising:

a multilayer optical film comprising a plurality of microlayers numbering at least 10 in total, each of the microlayers having an average thickness of less than about 500 nm, such that for light incident on the multilayer optical film and for each of a first polarization state and an orthogonal second polarization state, the plurality of microlayers has:

for the light incident on the optical film along a first direction, an optical transmittance T1 for a first wavelength and an optical transmittance T2 for a different second wavelength, T1>10T2; and for the light incident on the optical film along a second direction, an optical transmittance T1' for the first wavelength and an optical transmittance T2' for the second wavelength, T2'>10T1';

a lens layer comprising a structured first major surface comprising an array of at least first and second microlenses; and a first light absorbing layer disposed on, and spaced apart from, the structured first major surface layer and on a side of the structured first major surface facing away from the multilayer optical film, and defining an array of at least first and second through openings therein, there being a one-to-one correspondence between the first microlenses and the first through openings and between the second microlenses and the second through openings, each pair of corresponding first microlens and first through opening centered on a first optical axis substantially parallel to the first direction, each pair of corresponding second microlens and second through opening centered on a second optical axis substantially parallel to the second direction.

13. The optical system of claim 12, wherein the first and second directions form an angle of greater than about 5 degrees therebetween.

14. The optical system of claim 12, wherein one of the first and second wavelengths is a visible wavelength between about 420 nm and about 680 nm, and the other one of the first and second wavelengths is an infrared wavelength between about 750 nm and about 1300 nm.

15. The optical system of claim 12, wherein T1-T2 is greater than about 20% and T2'-T1' is greater than about 20%.

* * * * *